United States Patent
Mendelson et al.

(10) Patent No.: US 8,214,817 B2
(45) Date of Patent: Jul. 3, 2012

(54) DETECTING CHANGE IN PROGRAM BEHAVIOR FOR ADAPTIVE CODE OPTIMIZATION

(75) Inventors: Bilha Mendelson, Haifa (IL); Nitzan Peleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/869,477

(22) Filed: Oct. 9, 2007

(65) Prior Publication Data

US 2009/0094590 A1   Apr. 9, 2009

(51) Int. Cl.
*G06F 9/45*   (2006.01)
(52) U.S. Cl. .................. 717/158; 717/157; 717/130
(58) Field of Classification Search .......... 717/127–133, 717/151–161
See application file for complete search history.

(56) References Cited

U.S. PATENT DOCUMENTS

| | | | |
|---|---|---|---|
| 5,950,009 A * | 9/1999 | Bortnikov et al. ............ | 717/158 |
| 6,275,981 B1 * | 8/2001 | Buzbee et al. ................ | 717/158 |
| 6,308,324 B1 * | 10/2001 | Roediger et al. .............. | 717/158 |
| 6,631,518 B1 | 10/2003 | Bortnikov et al. | |
| 7,032,217 B2 | 4/2006 | Wu | |
| 2004/0194077 A1 * | 9/2004 | Bharadwaj et al. ........... | 717/158 |

FOREIGN PATENT DOCUMENTS

EP   1004961 B1   7/2003

OTHER PUBLICATIONS

Hiser et al., "Techniques and Tools for Dynamic Optimization", Proceedings of 20th International Parallel and Distributed Processing Symposium, Apr. 2006, Rhodes Island, Greece, IEEE, pp. 1-8.

* cited by examiner

*Primary Examiner* — Ted T Vo
(74) *Attorney, Agent, or Firm* — Yee & Associates, P.C.; Suzanne Erez

(57) ABSTRACT

A computer implemented method, apparatus, and computer program product for generating an optimization insensitive behavior profile. In one embodiment, a source identifier is assigned to each instruction in an original control flow graph representing a program code prior to optimization. The identifiers identify a basic block associated with the instruction or a group of basic blocks. A source identifier in the set of source identifiers is assigned to instructions in an optimized control flow graph representing the program code after optimizing the program code. The instructions in the optimized control flow graph are mapped to the original control flow graph using the set of source identifiers to form a mapping transformation. Behavior profile data associated with the optimized program code is moved to basic blocks in the original control flow graph using the mapping transformation to form the optimization insensitive behavior profile.

17 Claims, 6 Drawing Sheets

| CFGOrg | | | CFGOpt | | |
|---|---|---|---|---|---|
| Sid1 | 0862c | beq 08808 | 05d10 | lbz r26,1(r12) | Sid3 |
| | | | 05d14 | stbu r29,1(r12) | Sid3 |
| | | | 05d18 | cal r31,1(r10) | Sid3 |
| | | | 05d1c | cmp 0,r11,r26 | Sid3 |
| | | | 05d20 | beq 05d68 | Sid1 |
| Sid2 | 08630 | lbz r29,1(r12) | 05d24 | lbz r29,1(r12) | Sid2 |
| | 08634 | stbu r26,1(r12) | 05d28 | stbu r26,1(r12) | Sid2 |
| | 08638 | cal r10,2(r10) | 05d2c | cal r10,2(r10) | Sid2 |
| | 0863c | cmp 0,r11,r29 | 05d30 | cmp 0,r11,r29 | Sid2 |
| | 08640 | beq 08658 | 05d34 | beq 05d60 | Sid2 |
| Sid3 | 08644 | lbz r26,1(r12) | 05d38 | lbz r26,1(r12) | Sid3 |
| | 08648 | stbu r29,1(r12) | 05d3c | stbu r29,1(r12) | Sid3 |
| | 0864c | cal r31,1(r10) | 05d40 | cal r31,1(r10) | Sid3 |
| | 08650 | cmp 0,r11,r26 | 05d44 | cmp 0,r11,r26 | Sid3 |
| | 08654 | b 0862c | 05d48 | beq 05d68 | Sid1 |
| | | | 05d4c | lbz r29,1(r12) | Sid2 |
| | | | 05d50 | stbu r26,1(r12) | Sid2 |
| | | | 05d54 | cal r10,2(r10) | Sid2 |
| | | | 05d58 | cmp 0,r11,r29 | Sid2 |
| | | | 05d5c | bne 05d10 | Sid2 |

DETECTING CHANGE IN PROGRAM BEHAVIOR FOR ADAPTIVE CODE OPTIMIZATION

BACKGROUND OF THE INVENTION

1. Field of the Invention

The present invention is related generally to a data processing system and in particular to a method and apparatus for behavior profiles. More particularly, the present invention is directed to a computer implemented method, apparatus, and computer usable program code for comparison of behavior profiles collected during adaptive optimization cycles.

2. Description of the Related Art

A control flow graph is a representation of all paths that may be traversed during execution of a program. A basic block forms each node in a control flow graph. A basic block is a group of machine instructions that are executed together. A basic block has a single entry point and a single exit point. A basic block typically only includes branch instructions at the end of the basic block. A branch instruction may also be referred to as a jump instruction. In other words, a basic block is a piece of code in which every instruction in the basic block code is executed in a sequential order without any branches in the code. Control flow graphs are typically used by compiler optimizations and program performance analysis tools. The directed edges in the control flow graph represent the branch instructions.

Performance analysis, which is also referred to as profiling, is a tool for measuring and describing a program's behavior using information collected during execution of the program. A common way to represent program behavior is via a profile. The output of a performance analysis is a series of recorded events or sequence of basic blocks that execute one after another, referred to as a trace. The events are described in a summary that is frequently referred to as a profile. The profile attaches information describing program behavior during runtime to elements in a control flow graph representing the program execution.

The profile generally includes information describing program behavior such as, but not limited to, execution frequency of each basic block, duration of function calls, frequency of function calls, the number of cache misses in each natural loop, and so forth. Profiling can also describe program behavior features that are not related to performance, such as, without limitation, instruction execution frequency.

In one solution, dynamic optimizers optimize a code portion, such as, without limitation, methods and traces, when they become "hot." A hot method or hot trace is a method or trace that is frequently traversed or executed. Behavior profiles are used to determine which parts of a program to optimize. Optimizations of program code can result in improved execution speed, more efficient memory usage, and/or any other domains for improving performance of the code during execution.

Optimizers typically optimize frequently executed code, such as, but not limited to, hot loops or hot traces, only once during the optimization process or only one per optimization level. These optimizers do not adapt to changes in profile information and execution paths occurring during execution of the program code. However, many optimizations like inlining, specialization, and code reorder that might benefit from adaptive optimization that is profile directed, such as adaptive code optimization.

In adaptive optimization, an optimization cycle adapts the program code to the current behavior of the program code. The domain in adaptive optimization is program compilation or program re-compilation. The behavior profile based adaptive code optimization aims at characterizing the program behavior using profiles, optimizing the code to improve performance, and detecting significant dynamic changes in the program behavior to trigger re-optimization of the optimized code. This cycle of performance analysis and dynamic optimization during program execution occurs in a continuous process that monitors the application occasionally and re-adapts the application when a significant change in program behavior is detected. However, adaptive code optimizations change the program code of the optimized applications and make the comparison of currently available behavior profiles for different optimization cycles of the same program code difficult or impossible.

SUMMARY OF THE INVENTION

The illustrative embodiments provide a computer implemented method, apparatus, and computer usable program code for generating optimization insensitive behavior profiles. In one embodiment, a source identifier is assigned to each instruction in an original control flow graph to form a set of source identifiers. The original control flow graph represents a program code prior to an optimization. The source identifier identifies a basic block associated with the instruction. A source identifier in the set of source identifiers is assigned to each instruction in a set of optimized instructions in an optimized control flow graph. The optimized control flow graph represents the program code after optimizing the program code. The instructions in the optimized control flow graph are mapped to the original control flow graph using the set of source identifiers to form a mapping transformation. Behavior profile data associated with the optimized control flow graph is moved to basic blocks in the original control flow graph using the mapping transformation to form an optimization insensitive behavior profile.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
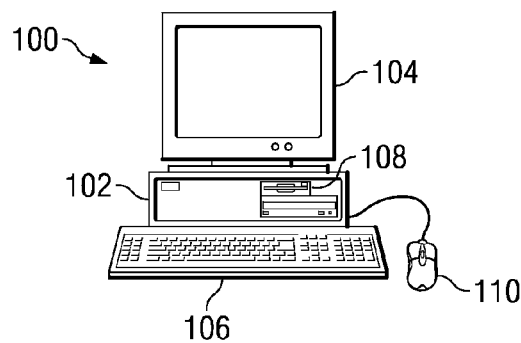
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

In this example, computer 100 includes a performance profiler. The performance profiler may be any type of known or available performance profiler for generating behavior profiles describing program code behavior during execution of the program code. Computer 100 also includes an adaptive code optimizer for performing adaptive optimization cycles based on the behavior profiles.

Computer 100 may be any suitable computer, such as an IBM® eServer™ computer or IntelliStation® computers, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
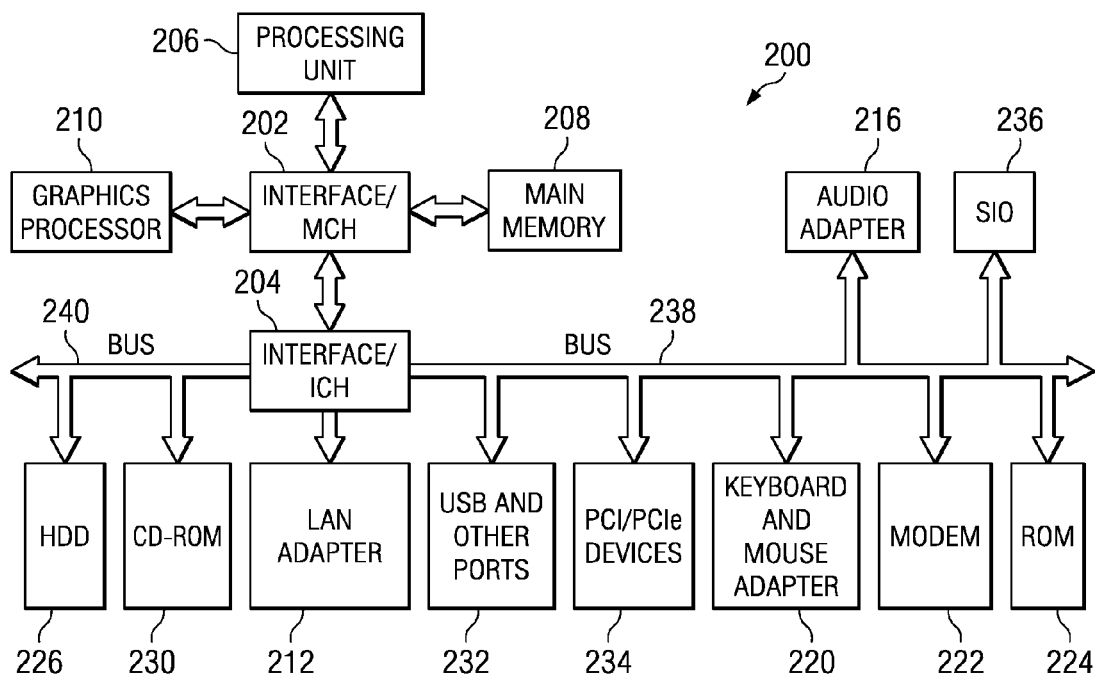
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A behavior profile generated during a performance analysis of a program generally includes information describing program behavior such as, but not limited to, execution frequency of each basic block, duration of function calls, frequency of function calls, the number of cache misses in each natural loop, and so forth. An example of such a profile is a basic block profile.

In one example of basic block profiles, each basic block has a vector entry. Each basic block entry represents information associated with the basic block. Information associated with the basic block may include, but is not limited to, information describing how many times the basic block code has been executed or how many times a hardware event was sampled in the basic block. At the end of the monitoring process, the basic block profile is typically normalized. Normalizing the basic block profile may be accomplished by dividing each entry block counter by the total of all counters in the basic block profile.

In adaptive optimization, an optimization cycle adapts the program code to the current behavior of the program code. The behavior profile based adaptive code optimization aims at characterizing the program behavior using profiles, optimizing the code to improve performance, and detecting significant dynamic changes in the program behavior to trigger re-optimization of the optimized code. This cycle of performance analysis and dynamic optimization during program execution occurs in a continuous process that monitors the application occasionally and re-adapts the application when a significant change in program behavior is detected.

The illustrative embodiments recognize that behavior profile based adaptive code optimizations change the program code of the optimized applications and make the comparison of behavior profiles for the original un-optimized program code with different optimized versions of the program code difficult. Therefore, the illustrative embodiments recognize a need for a transformation to the behavior profiles that make the behavior profiles insensitive to adaptive code optimizations and enable a comparison of the behavior profiles collected in different optimization cycles.

Therefore, the illustrative embodiments provide a computer implemented method, apparatus, and computer usable program code for generating optimization insensitive behavior profiles. In one embodiment, an original control flow graph representing a program code prior to an optimization is identified. A source identifier is assigned to each instruction in the original control flow graph to form a set of source identifiers. As used herein, the term "set" refers to one or more. Thus, a set of source identifiers may include a single source identifier, as well as two or more source identifiers. The source identifier identifies a basic block associated with the instruction.

An optimized control flow graph representing the program code after optimizing the program code is generated. A source identifier in the set of source identifiers is assigned to each instruction in a set of instructions in the optimized control flow graph. As used herein, a set of instructions includes one or more instructions in the optimized control flow graph. In other words, a source identifier is assigned to one or more of the instructions in the optimized control flow graph. In this embodiment, a source identifier is not assigned to every instruction in the optimized control flow graph. However, in another embodiment, a source identifier is assigned to every instruction in the optimized control flow graph.

The instructions in the optimized control flow graph are mapped to the original control flow graph using the set of source identifiers to form a mapping transformation. Behavior profile data associated with the optimized control flow graph is moved to basic blocks in the original control flow graph using the mapping transformation to form an optimization insensitive behavior profile.

In one embodiment, the process compares the optimization insensitive behavior profile to an original behavior profile for the program code that was generated prior to performing any optimizations on the program code. In another embodiment, the process compares the optimization insensitive behavior profile to a second optimization insensitive behavior profile generated during a previous optimization cycle. The optimization insensitive behavior profile is used to compare a behavior of the program code across multiple optimization cycles.

During each optimization cycle, the optimization process typically alters the program code by duplicating code, deleting code, compressing code, and otherwise modifying the program code to improve or optimize performance of the program code during execution. The optimization performed during each optimization cycle may be very different. Therefore, it can be difficult or impossible to compare the behavior or performance of the program code in one optimization cycle to the behavior or performance of the same program in a different optimization cycle due to the alterations in the program code that occur during each optimization cycle.

The purpose of optimization insensitive behavior profiles is to allow a user to compare the behavior or performance of a program during one optimization cycle with the behavior or performance of the same program during a different optimization cycle. In other words, the optimization insensitive behavior profiles create a common representation of the program code that can be used to compare performance and/or behavior of the program code after the program code has undergone different optimizations.

For example, if a first program code segment is duplicated during optimization to form a second and third program code segment, the optimization insensitive program code maps the profile data for the second and third program code segments back to the first program code segments. In this manner, when a user or program wants to compare the behavior of the program code during the two different optimization cycles, the profile data for the second and third program code segments will be correctly compared to the profile data for the first program code segment.

The illustrative embodiments described herein are also applicable to profiles that associate program behavior information with basic block groups, such as, without limitation, loop profile and/or function profiles. In such a profile, each entry in the profile represents the group of basic blocks. A basic block group is a group of all the basic blocks that are executed for a particular function or loop. For example, the basic block group may represent all the basic blocks within a function or all the basic blocks with a loop. If a basic block is included within two or more loops, the basic block is associated with the basic block group representing the smaller, closer loop of the two or more loops.

Figure 3:
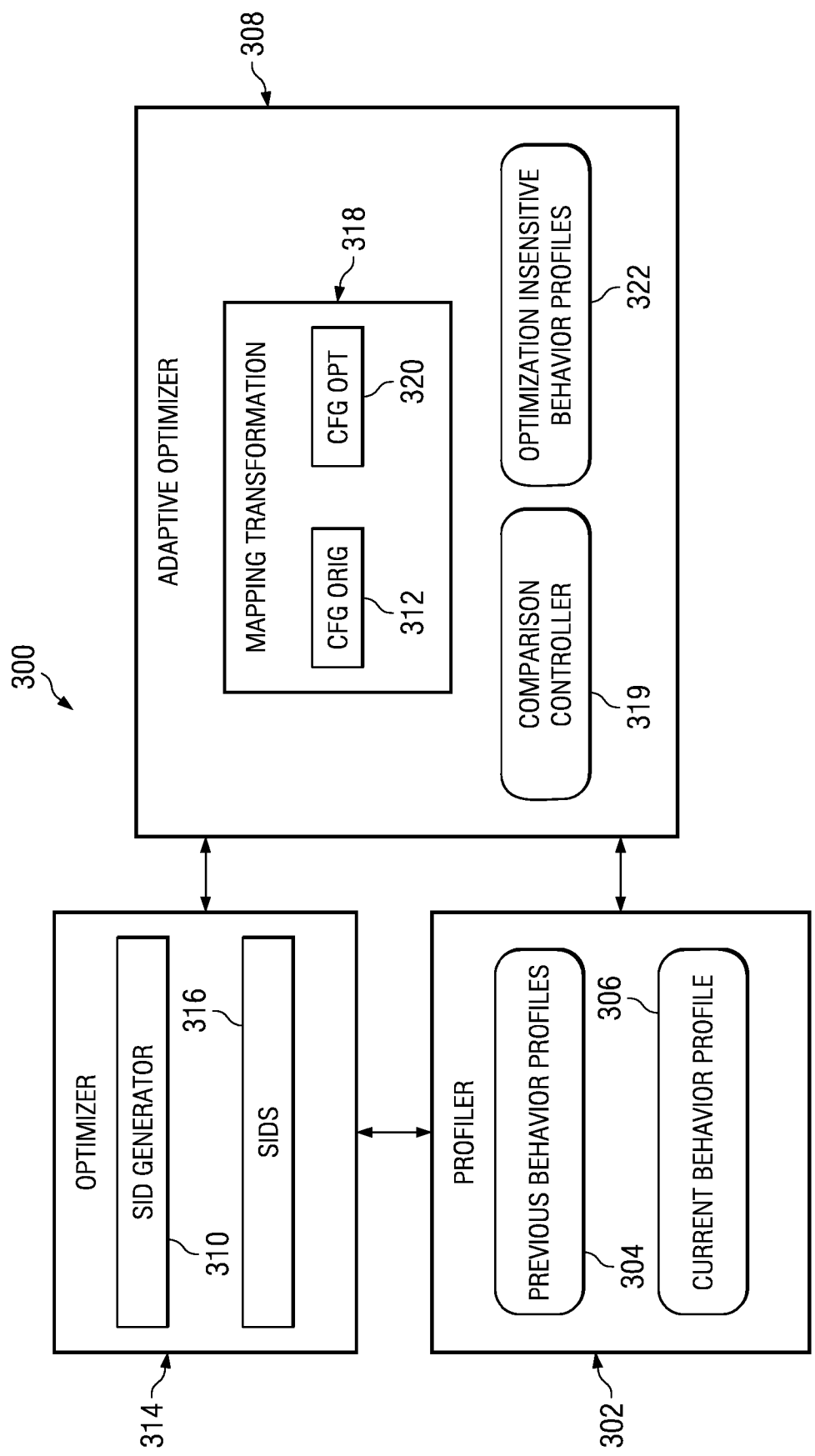
FIG. 3 is a block diagram illustrating a data flow through a data processing system when optimization insensitive behavior profiles are created in accordance with an illustrative embodiment.

FIG. 3 is a block diagram illustrating a data flow through a data processing system when optimization insensitive behavior profiles are created in accordance with an illustrative embodiment. Computer 300 may be implemented using any type of computing device, such as a personal computer, laptop, personal digital assistant, a server, or any other computing device depicted in FIGS. 1 and 2.

Profiler 302 is a performance analyzer for generating behavior profiles that describe the behavior of program code during runtime. Profiler 302 may be implemented in any type of known or available performance analysis tool or program instrumentation method. Profiler 302 generates profiles for the program at all steps of optimization. In other words, profiler 302 can profile a program both before optimization and after optimization.

In this example, profiler 302 generates previous behavior profiles 304. Previous behavior profiles 304 are behavior profiles describing the behavior of the program code before any optimizations are performed and/or profiles describing the behavior of the program code during previous optimization cycles.

Profiler 302 also generates current behavior profile 306. Current behavior profile 306 is a profile describing the behavior of the program code during a current optimization cycle.

Adaptive optimizer 308 is a software component for producing a behavior profile that is optimization insensitive. In this example, adaptive optimizer 308 is a separate component from optimizer 314. However, in another embodiment, optimizer 314 is a component included within adaptive optimizer 308.

Optimizer 314 is a behavior profile based adaptive code optimizer. Optimizer 314 may be implemented in any offline or online code optimizer. An offline optimizer is an optimizer that optimizes code between program activations. An online optimizer is an optimizer that performs optimizations while the program is running. Optimizing applications dynamically involves code and data modifications.

The code optimizations performed by optimizer 314 modify the code layout and therefore may harm the ability of optimizer 314 to compare behavior profiles of the same program that were generated before a given optimization cycle with behavior profiles of the same program that were generated after the given optimization cycle. Therefore, adaptive optimizer 308 uses mapping transformation 318 to generate a profile that is insensitive to code modifications.

Source identifier (SID) generator 310 is a software component associated with optimizer 314 for generating a source identifier for instructions in each basic block or basic block group. Source identifier generator 310 generates a SID for each instruction in original control flow graph 312. Original control flow graph 312 is a representation of program code prior to an optimization being performed on the program code by optimizer 314.

Mapping transformation 318 uses a set of program function control flow graphs, such as original control flow graph (CFG orig) 312 and optimized control flow graph (CFG opt) 320 that is maintained during adaptive optimization. Original control flow graph (CFG orig) 312 is a reference control flow graph representing a previous version of the program code. Thus, original function control flow graph 312 may be a control flow graph for the original un-optimized program code or a control flow graph for the optimized program code from a previous optimization cycle. Optimized control flow graph (CFG opt) 320 is a control flow graph representing the currently optimized program code. Thus, optimized control flow graph 320 may be an optimized version of the original un-optimized program code or a re-optimized version of the optimized program code.

Optimizer 314 generates source identifiers (SIDs) and assigns a source identifier to each instruction in original control flow graph 312. A source identifier is a unique identifier of a basic block that contains instructions in original control flow graph 312. During optimizer, optimizer 314 moves binary instruction and source identifiers (SIDs) 316 together. In other words, when optimizer 314 moves or alters given code during optimization, optimizer 314 moves the SID associated with the given code with the code.

In this example, when optimizer 314 moves code, creates code, duplicates code, and/or combines code, optimizer 314 assigns SIDS 316 based on the optimization logic. For example, when new instructions are created, optimizer 314 assigns a SID from SIDs 316 to the newly created instructions. For example, optimizer 314 attaches SIDs associated with the original program code to duplicated code when optimizer 314 performs optimizations that duplicate code, such as, without limitation, specialization or loop unrolling optimization.

When optimizer 314 combines code during optimization, optimizer 314 assigns multiple SIDs to the combined instruction. In other words, when optimizer 314 combines code instructions, such as an instruction 1 assigned to SID 1 and an instruction 2 assigned to SID 2 to form a combined instruction 3, optimizer 314 attaches all the original SIDS to the combined code. In this example, optimizer 314 assigns SID 1 and SID 2 to combined instruction 3.

If a new instruction does not have a SID that corresponds to the original program code, adaptive optimizer 308 uses the SID of the near instruction in the basic block. If all the instructions in a given basic block or basic block group are new and no corresponding SID is found, mapping transformation 318 ignores the basic block.

When optimizer 314 combines code in optimizations, such as common sub-expression elimination and loop fusion, the optimizer attaches all multiple original SIDS to each instruction in the combined code. When mapping transformation 318 moves the profile information associated with instructions that have multiple SIDs in optimized control flow graph 320 to original control flow graph 312, mapping transformation 318 moves a special value to all these SIDS.

Comparison controller 319 is a comparison method, also referred to as a similarity function. Comparison controller 319 compares current behavior profile 306 to other previous profiles that were created in previous optimization cycles, such as previous behavior profiles 304. Comparison controller 319 compares these behavior profiles after they have been converted by mapping transformation 318 to optimization insensitive behavior profiles.

If instructions have been combined during the optimization process, optimizer 314 associates multiple SIDs to the combined instruction to indicate that the profile data for the instruction is behavior data for a combined instruction. The mapping transformation moves a special value to the SIDs assigned to the combined instructions. Comparison controller 319 makes a determination as to whether to ignore profile information for basic blocks that have special values. A special value may be any type of value, such as but not limited to, "−1".

If basic block has special values and additional none special values, comparison controller 319 decides whether to use the profile information for that basic block based on the nature on the profile. For example, in execution frequency profile one can ignore the basic block in compression process only if it has only special values and use it if it has also some regular values.

In another example, when code in the original program code is combined in the optimized code, multiple source identifiers may be assigned to the same basic block that is merged. Mapping transformation 318 moves profile information to original control flow graph 312 and moves special values to all the SIDS in instructions that have multiple SIDS in optimized control flow graph 320 due to optimizations that combine code. This enables the mapping transformation to determine where the basic block version of the program code in the combined code originated.

The instances of the source identifier associated with the special values are then ignored by the comparison process 319 to prevent source identifiers from being recognized multiple times based on a single basic block during mapping of the optimized control flow graph to the original control flow graph in instances where code has been combined.

Mapping transformation 318 uses the SIDS assigned to instructions in optimized control flow graph to move profile information for the optimized program code to original control flow graph 312 to form optimization insensitive behavior profiles 322. In other words, mapping transformation 318 moves profile information to original control flow graph 312 and by doing so, mapping transformation 318 creates optimization insensitive behavior profiles 322. Optimization insensitive behavior profiles 322 includes profile data for optimized code to the corresponding basic block or basic block group in original control flow graph 312 to form optimization insensitive behavior profiles 322. In this manner, mapping transformation 318 creates a mapping from instructions in optimized control flow graph 320 to the SIDs in original control flow graph 312.

Thus, mapping transformation 318 produces optimization insensitive behavior profiles 322 by transforming all behavior profiles collected during adaptive code optimization to original control flow graph 312. This transformation is referred to as the mapping transformation. The mapping transformation moves behavior profiling information associated with optimized control flow graph 312 to original control flow graph 312. This transformation enables comparison controller 319 of adaptive optimizer 308 to compare behavior profiles in different optimization cycles.

Optimization insensitive behavior profiles 322 is an optimization insensitive behavior profile that enables detecting a significant change in program behavior and triggering a new code optimization by optimizer 314. Optimization insensitive behavior profiles 322 is optimization insensitive and can, therefore, be used across multiple optimization cycles. In other words, optimization insensitive behavior profiles 322 allows comparing current behavior profile 306 with one or more profiles in previous behavior profiles 304 collected during previous optimization cycles.

In this example, optimizer 314 optimizes the program code represented by original control flow graph 312 applying loop unrolling optimization. All the instructions in each basic block in optimized control flow graph 320 correspond to one basic block in original control flow graph 312. However, in another embodiment, instructions in a single basic block in optimized control flow graph 320 correspond to different basic blocks in original control flow graph 312. Therefore, mapping transformation 318 supports mapping of instructions in optimized control flow graph 320 to the relevant SID in original control flow graph 312. In one embodiment, all instructions in optimized control flow graph 320 are mapped to the corresponding basic block in original control flow graph 312.

However, in another embodiment, one or more basic blocks in optimized control flow graph 320 do not have a SID assigned to any instruction in the basic block. In this example, all instructions in these basic blocks in optimized control flow graph 320 are not mapped to the corresponding basic blocks in original control flow graph 312.

In another embodiment, mapping transformation assigns a source identifier (SID) to a basic block group rather than assigning the SID to a single basic block. To adjust the mapping transformation to basic block groups, mapping transformation 318 uses the SID of the basic block group to map instructions associated with the basic block group in optimized control flow graph 320 to original control flow graph 312.

Figures 4, 5:
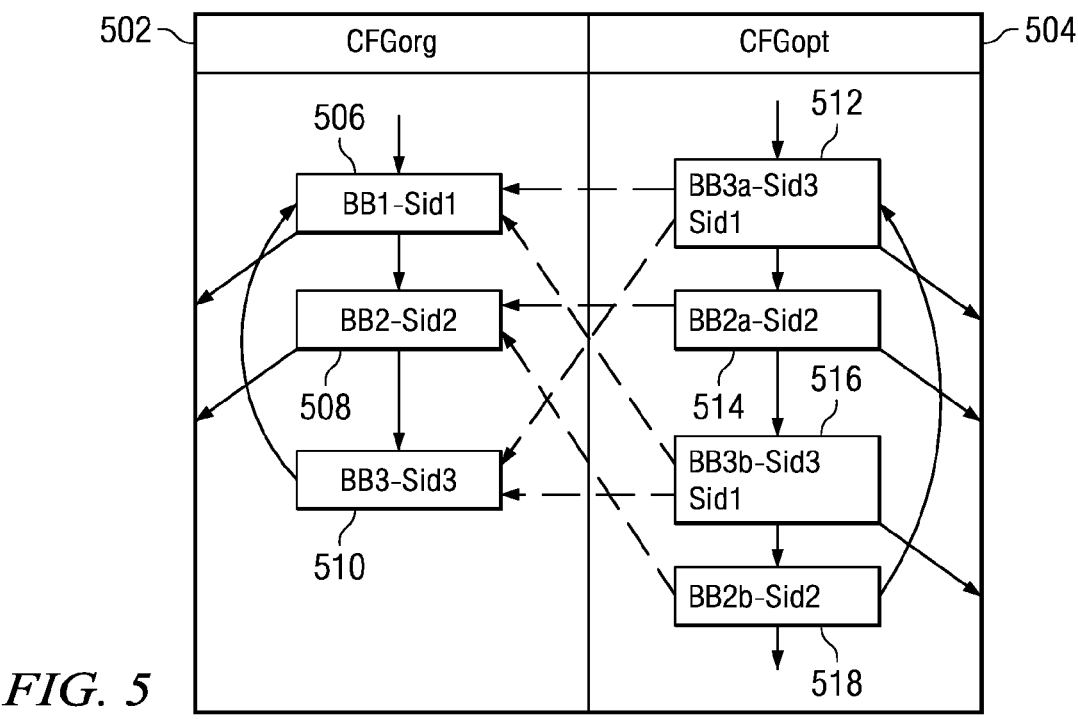
FIG. 4 is a block diagram of the instructions and source identifiers in each basic block for original code and for the optimized code in accordance with an illustrative embodiment.
FIG. 5 is a block diagram of a mapping transformation in accordance with an illustrative embodiment.

Turning now to FIG. 4, a block diagram of the instructions and source identifiers in each basic block for original code and for the optimized code in accordance with an illustrative embodiment is shown in accordance with an illustrative embodiment. Optimized control flow graph 400 is a control flow graph representing optimized program code. Original control flow graph 402 is a control flow graph representing the program code in a previous optimization cycle or the program code prior to any optimizations. The code in FIG. 4 is an exemplary illustration of performance optimized with enhanced RISC (POWER) instructions. However, the illustrative embodiments are applicable to any other type of instruction set as well.

Original control flow graph 402 represents code inside a loop before optimizations take place. Original control flow graph 402 includes basic block 406 having source identifier "Sid1." Basic block 408 is assigned to source identifier "Sid2." Basic block 410 is assigned to source identifier "Sid3."

Optimized control flow graph 400 is an example of program code inside the loop after two optimizations. Original control flow graph 402 shows the instructions within basic block boxes before optimization.

Control flow graph 404 shows the instructions within basic block boxes after optimization. In this example, optimized control flow graph represents the code inside the loop after loop unrolling and branch to branch elimination. Thus, FIGS. 4 and 5 below demonstrate how SIDs are places in the optimized code. Instructions in Box 412 and 416, for example, have two sides: Sid3 and Sid1. The mapping will map data from each one of these basic blocks to two different SIDS.

Turning now to FIG. 5, a block diagram of a mapping transformation is shown in accordance with an illustrative embodiment. FIG. 5 is a mapping transformation of the control flow graphs in FIG. 4.

Original control flow graph 502 is a control flow graph representing original program code prior to an optimization, such as original control flow graph 402 in FIG. 4. Optimized control flow graph 504 is a control flow graph representing the program code after an optimization is performed on the program code, such as optimized control flow graph 400 in FIG. 4. The optimization of the program code has merged and duplicated basic blocks. The optimizer has assigned a SID to each instruction in optimized control flow graph 504 that corresponds to SIDs in original control flow graph 502.

The arrows indicate the mapping from optimized control flow graph 504 to original control flow graph 502. The instructions in basic block 512 of optimized control flow graph 504 are assigned to "Sid3" and "Sid1." Therefore, the mapping transformation maps these instructions to basic block 506 corresponding to "Sid1" and basic block 510 corresponding to "Sid3" in original control flow graph 502.

The mapping transformation maps control flow graph 514 to control flow graph 508 in original control flow graph 502 because all the instruction in control flow graph 514 are assigned to "Sid2" which corresponds to "Sid2" in original control flow graph 502.

Figure 6:
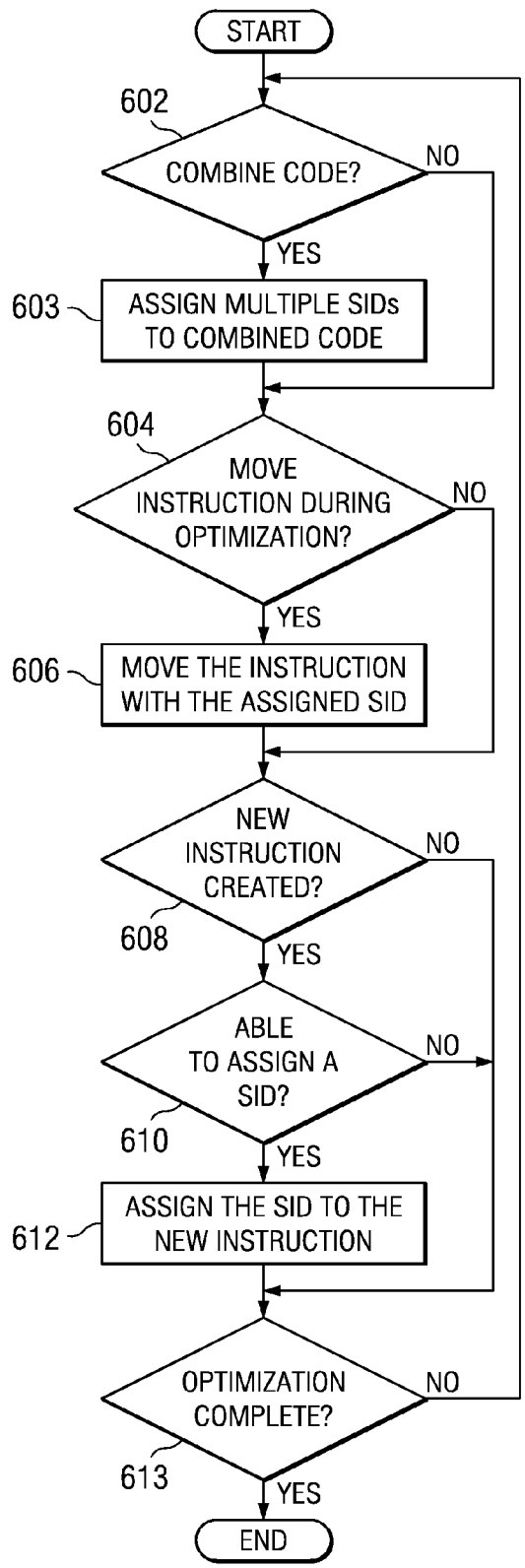
FIG. 6 is a flowchart of a process for assigning source identifiers to instructions in accordance with an illustrative embodiment.

Referring now to FIG. 6, a flowchart of a process for assigning source identifiers to instructions is depicted in accordance with an illustrative embodiment. The process in FIG. 6 is implemented by a software component for performing behavior profile based dynamic code optimizations, such as optimizer 314 in FIG. 3.

The process begins by making a determination as to whether the optimization combines code (step 602). If the optimization combines code, the process assigns multiple SIDS to the combined code (step 603). In other words, a SID for each instruction that is combined is assigned to the combined code.

The process makes a determination as to whether instructions will be moved during optimizations (step 604). If instructions are not moved, the process goes to step 608. If instructions are moved during optimizations, the process moves the instructions with the assigned source identifier (step 606). In this manner, when code is moved or modified, the code retains the source identifier that corresponds to the source identifiers in the original control flow graph.

The process makes a determination as to whether new instructions are created during optimization (step 608). If new instructions are not created, the process makes a determination as to whether optimization is complete (step 613). If optimization is not complete, the process returns to step 602. If optimization is complete, the process terminates thereafter.

If new instructions are created at step 608, the process makes a determination as to whether a source identifier is able to be assigned to the new instruction (step 610). A source identifier is able to be assigned to the new instruction if, for example, and without limitation, if an existing source identifier corresponds to the new instruction, if a source identifier of a near instruction can be assigned to the new instruction.

If the process is not able to assign a source identifier, the process makes a determination as to whether optimization is complete (step 613). If optimization is not complete, the process returns to step 602. If optimization is complete, the process terminates thereafter.

If the process is able to assign the source identifier at step 610, the process assigns source identifiers to the new instruction (step 612). The process makes a determination as to whether optimization is complete (step 613). If optimization is not complete, the process returns to step 602. If optimization is complete, the process terminates thereafter.

Thus, in this example, SIDs are assigned to the original control flow graph only once. When the adaptive optimizer triggers an optimization process, the optimizer has to maintain the SIDs in the optimized code. When the optimizer moves instructions, the optimizer moves the instructions with the SID assigned to the instruction being moved. When the optimizer duplicates code, the optimizer duplicates the SIDs assigned to the duplicated code. When the optimizer combines code, the optimizer assigns the combined instruction multiple SIDs. Each optimization cycle may apply multiple optimizations and may move, duplicate, or combine instructions multiple times.

In other words, optimization is a process of applying multiple optimizations, one after the other. The different optimization moves, duplicates, adds and combines code many times. Thus, each step in FIG. 6 may be implemented multiple times and the steps may be implemented out of order. In other words, steps 602, 604 and 608 may be implemented without a specific order. Thus, steps 610 and 611 may be implemented, without limitation, before steps 604-606 rather than after steps 604 and 606 without departing from the spirit and scope of the process described in FIG. 6.

Figure 7:
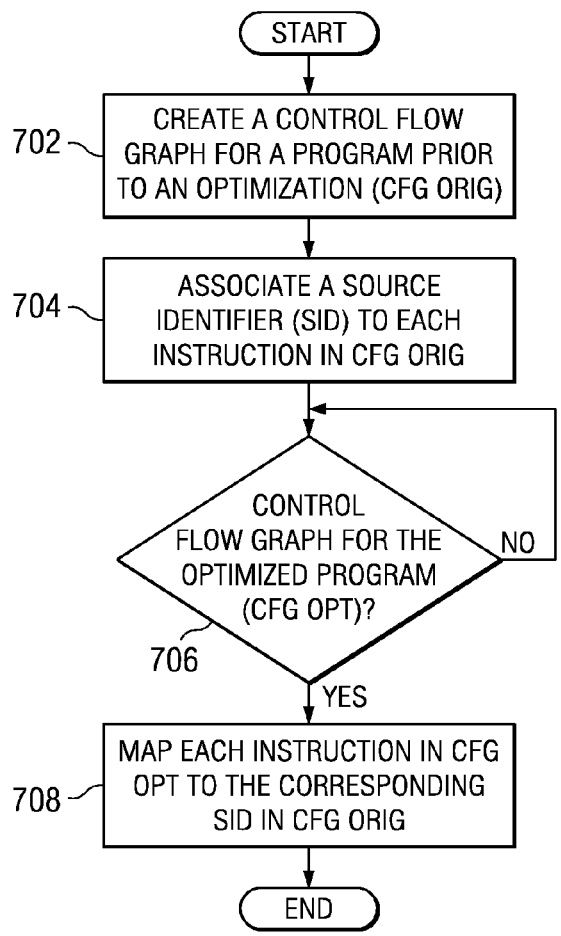
FIG. 7 is a flowchart of a process for mapping transformations in accordance with an illustrative embodiment.

FIG. 7 is a flowchart of a process for mapping transformations in accordance with an illustrative embodiment. The process in FIG. 7 is implemented by a software component for optimizing code, such as optimizer 314 in FIG. 3.

The process creates a control flow graph representing a program prior to an optimization to form an original control flow graph (CFG orig) (step 702). The process associates a source identifier (SID) to each instruction in the original control flow graph (step 704). The process makes a determination as to whether a control flow graph for optimized code is available (step 706). If an optimized control flow graph is not available, the process returns to step 706 until the optimized control flow graph is generated. The optimized control flow graph is final when the optimizer returns after the optimization is complete.

Returning to step 706, when the optimizer returns after the optimization is complete and the optimized control flow graph is available, the process maps each instruction in the optimized control flow graph to the corresponding source identifier in the original control flow graph (step 708) with the process terminating thereafter.

In one embodiment, after the optimizer maps the instructions to the original control flow graph, a mapping transformation then creates optimization insensitive profile based on the mapping data coming from the optimizer. In other words, the mapping transformation moves profile information associated with instruction in optimized control flow graph to the corresponding basic block or basic block group in original control flow graph using the mapping information. The mapping information includes the mapping of each instruction in the optimized control flow graph to the corresponding source identifier in the original control flow graph using the SIDS.

Figure 8:
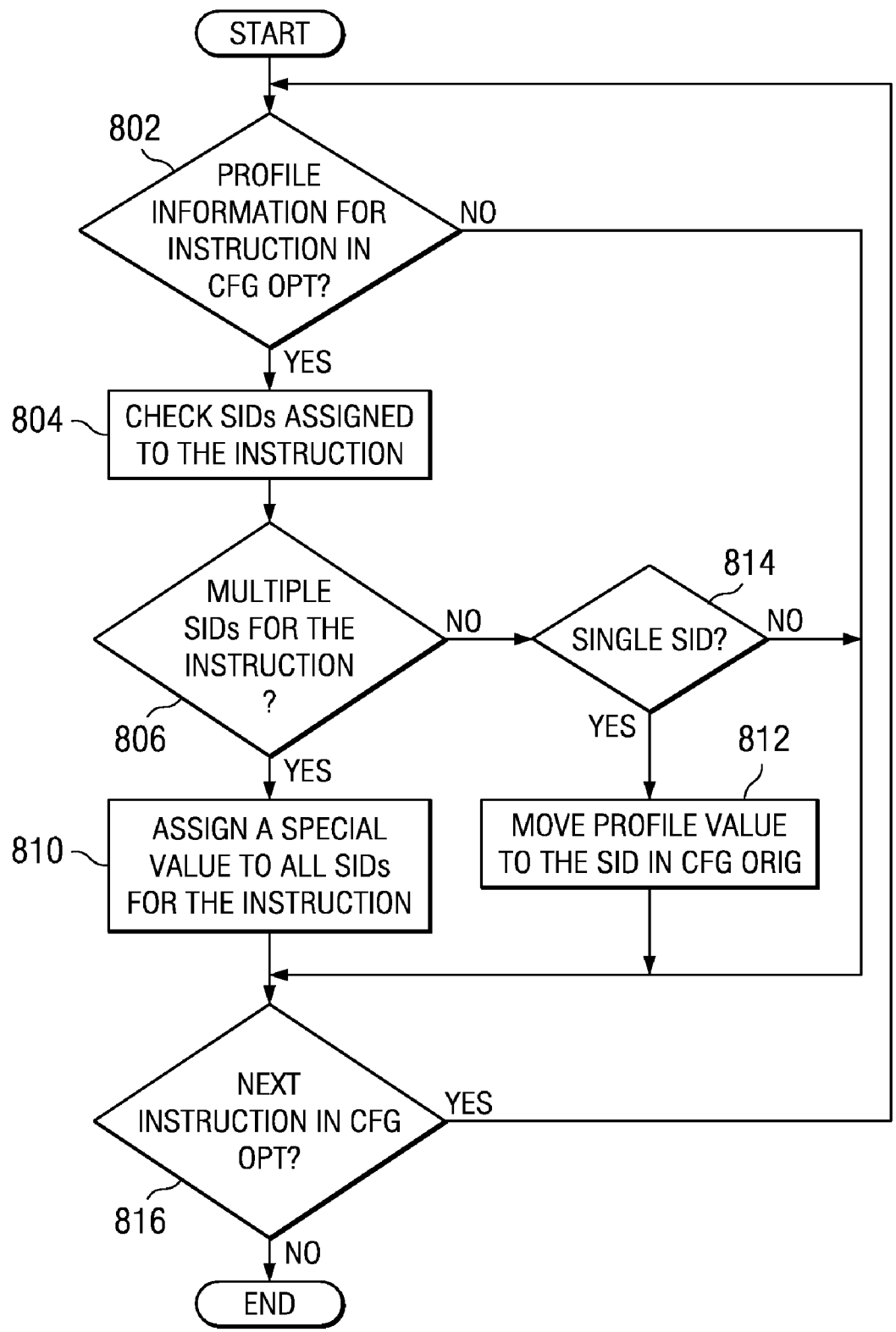
FIG. 8 is a flowchart of a process for associating profile information for optimized program code to a control flow graph for un-optimized program code in accordance with an illustrative embodiment.

Turning now to FIG. 8, a flowchart of a process for associating profile information for optimized program code to a control flow graph for original control flow graph is depicted in accordance with an illustrative embodiment. The process in FIG. 8 is implemented by software for mapping transformations to generate an optimization insensitive behavior profile, such as adaptive optimizer 308 in FIG. 3.

The process begins by making a determination as to whether profile information for an instruction in optimized control flow graph is present (step 802). If profile information is available, the process checks for SIDs assigned to the instruction (step 804). The process determines whether multiple SIDs are assigned to the instruction (step 806). If multiple instructions are assigned to the instruction, the process assigns a special value to all the SIDs assigned to the instruction (step 810). After that the process makes a determination as to whether a next instruction in the optimized control flow graph needs to be processed (step 816).

Returning to step 806, if multiple SIDs are not assigned to the instruction, the process makes a determination as to whether a single SID is assigned to the instruction (step 814). If a SID is not assigned to the instruction, the process makes a determination as to whether a next instruction in the optimized control flow graph needs to be processed (step 816). If a next instruction is present, the process returns to step 802 and iteratively executes steps 802-812 until all the instructions in optimized control flow graph have been checked for SIDs assigned to the instructions and corresponding profile values have been moved to the SIDs. When a next instruction is not found at step 816, the process terminates thereafter. terminates thereafter.

Returning to step 814, if a single SID is assigned to the instruction, the process moves the profile value from the profile information associated with the instruction to the SID in CFG orig (step 812). The single instruction is not associated with a special value because only a single SID was assigned to the instruction.

The process makes a determination as to whether a next instruction in the optimized control flow graph needs to be processed (step 816). If a next instruction is present, the process returns to step 802 and iteratively executes steps 802-812 until all the instructions in optimized control flow graph have been checked for SIDs assigned to the instructions and corresponding profile values have been moved to the SIDs. When a next instruction is not found at step 816, the process terminates thereafter. Thus, in this manner, the process moves the profile information associated with instructions in the optimized control flow graph using SIDs. The instructions in the optimized control graph having profile values assigned to them are mapped using the SIDs to corresponding basic blocks in the original control flow graph to form the optimization insensitive behavior profile.

Figure 9:
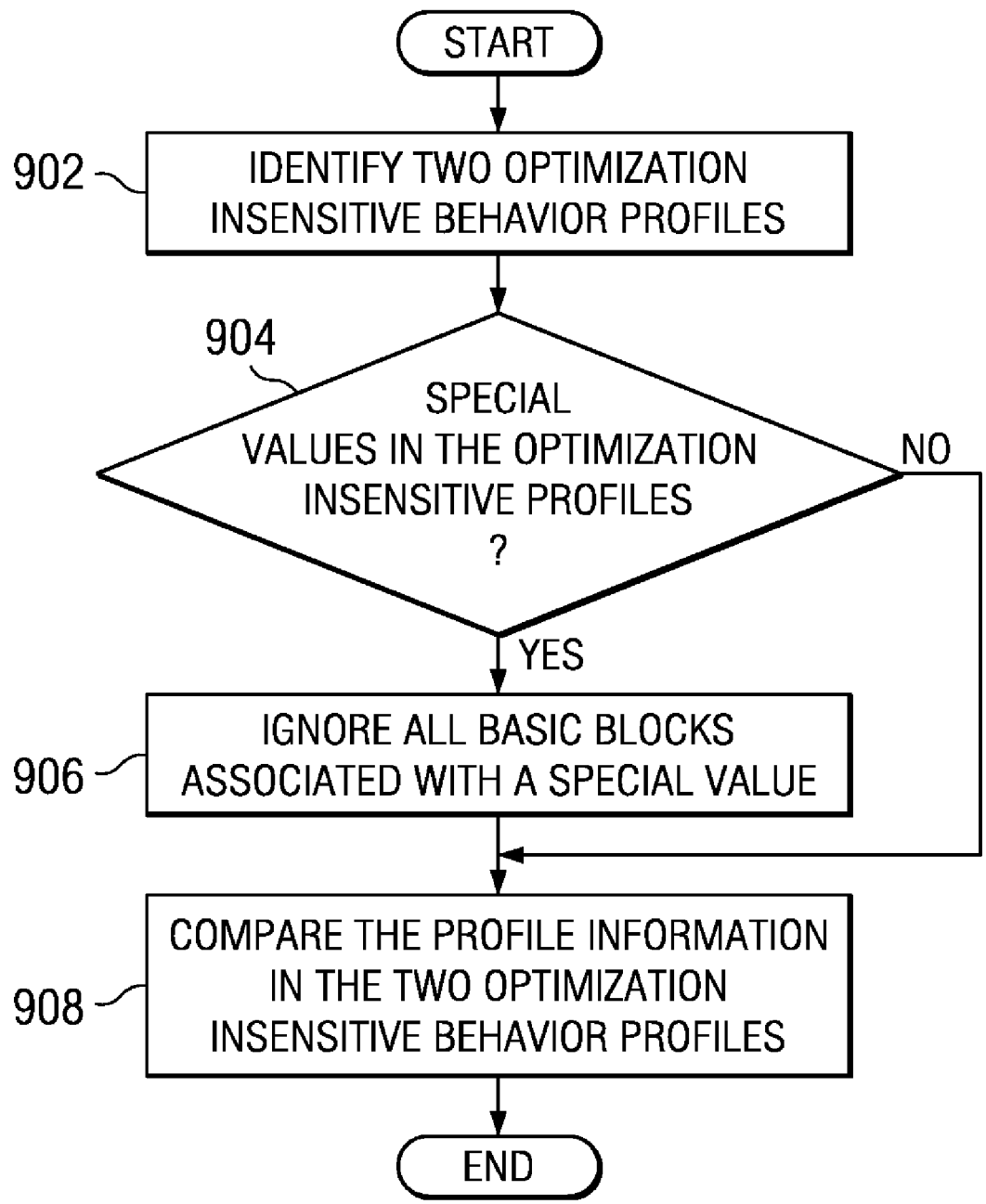
FIG. 9 is a flowchart of a process for comparing program behavior for optimized program code to program behavior for un-optimized program code using a special value in accordance with an illustrative embodiment.

FIG. 9 is a flowchart of a process for comparing behavior profile for optimized program code to other behavior profiles using a special value in accordance with an illustrative embodiment. The process is implemented by software for mapping transformations to generate an optimization insensitive behavior profile, such as adaptive optimizer 308 in FIG. 3. The comparison process in step 906 is implemented by comparison method as part of comparison of the optimization insensitive behavior profiles, such as comparison controller 319 in FIG. 3.

The process begins by identifying two optimization insensitive behavior profiles (step 902). One or more of the optimization insensitive behavior profiles may have been collected on the original control flow graph or one or more of the optimization insensitive behavior profiles may have been transformed by the mapping transformation.

The comparison controller makes a determination as to whether special values are present in the optimization insensitive profiles (step 904). If special values are present, the comparison controller ignores all the basic blocks that are associated with special values in their profile information (step 906).

If special values are not associated with the basic blocks at step 904 or after profile information associated with basic blocks having special values are disregarded, the process compares the two optimization insensitive behavior profiles with the process terminating thereafter.

In this example, the comparison controller operates on the basic block level. However, the comparison controller may also operate at a basic block group level and/or on the instruction level. In this example, if the comparison controller operates at a basic block group level, the comparison controller ignores all basic block groups that has only special values at step 906. If the comparison controller operates at an instruction level, the comparison controller ignores all instructions associated with a special value at step 906.

The illustrative embodiments have been described as using a source identifier for a single instruction or a single basic block. However, the illustrative embodiments may also be implemented using a group source identifier. In this example, a group source identifier is assigned to a basic block group. The group SID is assigned to each instruction in the basic block group. In other words, the instructions in the basic block group have the same SID, which is the group SID. The only difference between basic block group profile and basic block profile is in the compression process. During the compression process in which code is combined for optimization, the process ignores basic block group that have special values only if they do not have regular values. The special value is used to indicate that the basic block group should be ignored.

The illustrative embodiments have been described in terms of dynamic code optimizations performed online while the program code is running. However, the illustrative embodiments may also be implemented offline in a static code optimizer by optimizing the program between runs.

The illustrative embodiments provide a computer implemented method, apparatus, and computer usable program code for generating optimization insensitive behavior profiles. In one embodiment, an original control flow graph representing a program code prior to an optimization is identified. A source identifier is assigned to each instruction in the original control flow graph to form a set of source identifiers. The source identifier identifies a basic block associated with the instruction.

An optimized control flow graph representing the program code after optimizing the program code is generated. A source identifier in the set of source identifiers is assigned to each instruction in a set of instructions in the optimized control flow graph. The set of instructions may include a single instruction or two or more instructions. The set of instructions may include all of the instructions in the optimized control flow graph.

In another example, the set of instructions may include only a subset or portion of the instructions in the control flow graph. In such as case, a source identifier is not assigned to all of the instructions in the optimized control flow graph.

The instructions in the optimized control flow graph are mapped to the original control flow graph using the set of source identifiers to form a mapping transformation. Behavior profile data associated with the optimized control flow graph is moved to basic blocks in the original control flow graph using the mapping transformation to form an optimization insensitive behavior profile.

Thus, the illustrative embodiments solve the problems associated with behavior profile based adaptive code optimization by providing a transformation to behavior profiles that make the behavior profiles insensitive to adaptive code optimizations and enable a comparison of behavior profiles collected during different optimization cycles. The adaptive code optimization insensitive behavior profiles enable detecting a significant change in program behavior and triggering new code optimizations by comparing current behavior profiles with behavior profiles collected in previous optimization cycles of the same program and behavior profiles for the program before any optimizations were performed. This permits continuous dynamic optimization based on comparisons of behavior profiles across different optimization cycles.

Thus, the illustrative embodiments enable comparison of behavior profiles during adaptive code optimization for any program code that can be transformed to basic block profile or profiles of basic block groups to improve optimization efficiency and accuracy of profiling information and optimizations.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating optimization insensitive behavior profiles, the computer implemented method comprising:
    assigning a source identifier to each instruction in an original control flow graph to form a set of source identifiers, wherein the original control flow graph represents a program code prior to an adaptive optimization, and wherein the source identifier identifies a basic block associated with the each instruction;
    assigning a source identifier in the set of source identifiers to each instruction in a set of instructions in an optimized control flow graph, wherein the optimized control flow graph represents the program code after adaptive optimizing the program code;
    mapping the instructions in the optimized control flow graph to the original control flow graph using the set of source identifiers to form a mapping transformation;
    moving behavior profile data associated with the optimized control flow graph to basic blocks in the original control flow graph using the mapping transformation to form an optimization insensitive behavior profile; and
    comparing the optimization insensitive behavior profile to a second optimization insensitive behavior profile generated during a previous adaptive optimization cycle, wherein the optimization insensitive behavior profile is used to compare a behavior of the program code across multiple adaptive optimization cycles.

2. The computer implemented method of claim 1 further comprising:
    responsive to combining code during optimization, assigning a special value to all source identifiers associated with the combined code.

3. The computer implemented method of claim 1 further comprising:
    responsive to generating a new instruction during optimization of the program code, assigning a source identifier to the new instruction.

4. The computer implemented method of claim 1 further comprising:
    responsive to moving an instruction in the program code during optimization, moving the instruction with the source identifier assigned to the instruction.

5. The computer implemented method of claim 1 further comprising:
    responsive to duplicating a given instruction to form a duplicated instruction, assigning a source identifier for the given instruction to the duplicated instruction, wherein both the given instruction and the duplicated instruction are assigned to the same source identifier.

6. The computer implemented method of claim 1 further comprising:
    disregarding profile data in the optimization insensitive behavior profile for basic blocks associated with a special value.

7. The computer implemented method of claim 1 further comprising:
    assigning a group source identifier to each instruction in a basic block group in the original control flow graph, wherein the each instruction in the basic block group is assigned to a same group source identifier.

8. The computer implemented method of claim 1 wherein the source identifier is assigned to instructions in the optimized control flow graph based on optimization logic, wherein optimization logic specifies whether the instructions are moved, duplicated, or combined during optimization.

9. A computer program product for generating optimization insensitive behavior profiles, the computer program product comprising:
    a non-transitory computer readable storage medium;
    program code stored on the non-transitory computer readable storage medium for assigning a source identifier to each instruction in an original control flow graph to form a set of source identifiers, wherein the original control flow graph represents a program code prior to an optimization, and wherein the source identifier identifies a basic block associated with the each instruction;
    program code stored on the non-transitory computer readable storage medium for assigning a source identifier in the set of source identifiers to each instruction in a set of instructions in an optimized control flow graph, wherein the optimized control flow graph represents the program code after optimizing the program code;
    program code stored on the non-transitory computer readable storage medium for mapping the instructions in the optimized control flow graph to the original control flow graph using the set of source identifiers to form a mapping transformation;
    program code stored on the non-transitory computer readable storage medium for moving behavior profile data associated with the optimized control flow graph to basic blocks in the original control flow graph using the mapping transformation to form an optimization insensitive behavior profile; and program code stored on the non-transitory computer readable storage medium for comparing the optimization insensitive behavior profile to a second optimization insensitive behavior profile generated during a previous optimization cycle, wherein the optimization insensitive behavior profile is used to compare a behavior of the program code across multiple optimization cycles.

10. The computer program product of claim 9 further comprising:
program code stored on the non-transitory computer readable storage medium for assigning a special value to all source identifiers associated with the combined code in response to combining code during optimization.

11. The computer program product of claim 9 further comprising:
program code stored on the non-transitory computer readable storage medium for assigning a source identifier to a new instruction in response to generating the new instruction during optimization of the program code.

12. The computer program product of claim 9 further comprising:
program code stored on the non-transitory computer readable storage medium for moving an instruction in the program code with the source identifier assigned to the instruction in response to moving the instruction during optimization.

13. The computer program product of claim 12 further comprising:
program code stored on the non-transitory computer readable storage medium for disregarding profile data in the optimization insensitive behavior profile for basic blocks associated with a special value.

14. The computer program product of claim 9 further comprising:
program code stored on the non-transitory computer readable storage medium for assigning a source identifier for a given instruction to a duplicated instruction in response to duplicating the given instruction to form the duplicated instruction, wherein both the given instruction and the duplicated instruction are assigned to the same source identifier.

15. An apparatus for generating optimization insensitive behavior profiles, the apparatus comprising:
a bus system;
a communications system coupled to the bus system;
a memory connected to the bus system, wherein the memory includes computer usable program code; and
a processing unit coupled to the bus system, wherein the processing unit executes the computer usable program code to assign a source identifier to each instruction in an original control flow graph to form a set of source identifiers, wherein the original control flow graph represents a program code prior to an optimization, and wherein the source identifier identifies a basic block associated with the each instruction; assigns a source identifier in the set of source identifiers to each instruction in a set of instructions in an optimized control flow graph, wherein the optimized control flow graph represents the program code after optimizing the program code; map the instructions in the optimized control flow graph to the original control flow graph using the set of source identifiers to form a mapping transformation; move behavior profile data associated with the optimized control flow graph to basic blocks in the original control flow graph using the mapping transformation to form an optimization insensitive behavior profile; and compare the optimization insensitive behavior profile to a second optimization insensitive behavior profile generated during a previous adaptive optimization cycle, wherein the optimization insensitive behavior profile is used to compare a behavior of the program code across multiple adaptive optimization cycles.

16. The apparatus of claim 15 wherein the processor unit further executes the computer usable program code to assign a special value to all source identifiers associated with the combined code in response to combining code during optimization.

17. The apparatus of claim 15 wherein the processor unit further executes the computer usable program code to assign a source identifier to a new instruction in response to generating the new instruction during optimization of the program code.

* * * * *